United States Patent
Schaffer et al.

[15] 3,696,895
[45] Oct. 10, 1972

[54] FLUIDIC CONTROL FOR MOTOR AND BRAKE

[72] Inventors: David J. Schaffer, Phoenix; Trevor G. Sutton, Maricopa, Ariz.

[73] Assignee: The Garrett Corporation, Los Angeles, Calif.

[22] Filed: June 24, 1971

[21] Appl. No.: 156,274

[52] U.S. Cl. ................ 192/3 R, 60/53 R, 137/81.5, 192/146, 192/147
[51] Int. Cl. ............................................. F16d 67/00
[58] Field of Search ...................... 192/3 R; 137/81.5

[56] References Cited

UNITED STATES PATENTS

| | | | |
|---|---|---|---|
| 3,380,495 | 4/1968 | Weston | 192/3 R |
| 3,575,209 | 4/1971 | Kast | 137/81.5 |
| 3,589,482 | 6/1971 | Weston | 192/3 R |

Primary Examiner—Benjamin W. Wyche
Attorney—Herschel C. Omohundro et al.

[57] ABSTRACT

This system controls the operation of a jet engine thrust reversing mechanism of the type operated by a reversible fluid motor. The control system is of the fluidic character having a first circuit portion for sensing the pressure differential at the inlet and outlet of the fluid motor and consequently the torque being exerted at any particular time and a second circuit portion for providing a pulsating signal with a frequency dependent upon the speed of the fluid motor. These signals are combined and dynamically compensated, the result being applied to a servo which controls the application of fluid pressure to actuators for snubbing and braking the fluid motor. The system is used primarily near the terminations of the deploying and stowing phases of operation of the thrust reversing structure.

8 Claims, 3 Drawing Figures

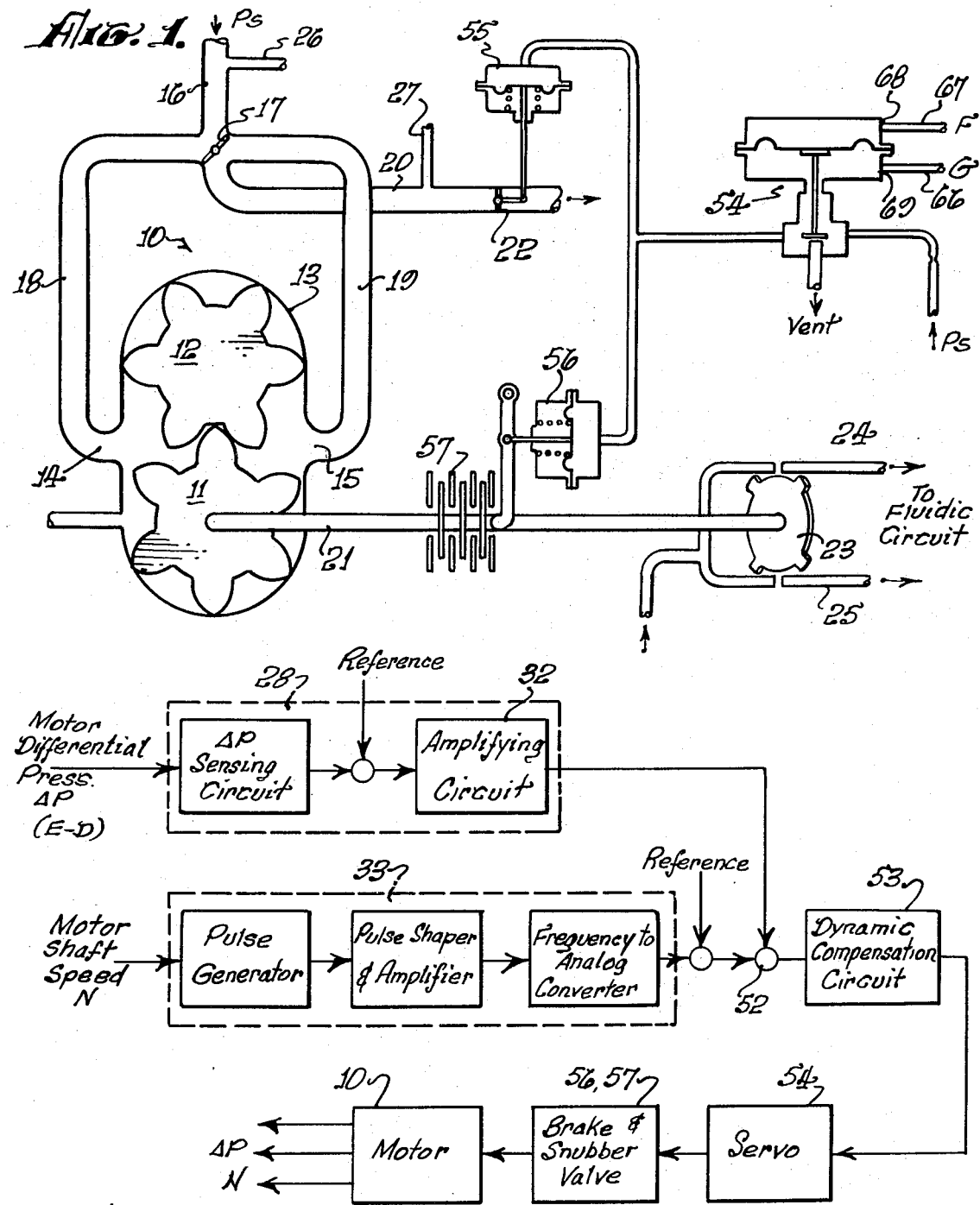

3,696,895

FLUIDIC CONTROL FOR MOTOR AND BRAKE

SUMMARY

This invention relates generally to thrust reverser mechanism employed on jet engines used particularly on aircraft and is more specifically directed to control systems for such thrust reverser mechanism.

Thrust reversing mechanism may be of many types, that to which the control system of the present invention is applied being of the type where structure is deployed to reverse the thrust and stowed during the normal engine operation. The mechanism also is of the type utilizing a reversible fluid motor to effect movement of the structure between deployed and stored positions. One feature desired in thrust reversing mechanism is that the actual reversing structure move quickly between deployed and stowed positions but without sudden jarring or damaging stops at the ends of such movement. The present invention is directed to a control system in which the structure can move with substantially unlimited speed throughout all but a small percentage of its travel and then be limited to a safe sure controlled speed during the final stage of such movement. To this end, the fluidic control system of the invention has been provided. This system includes a portion for sensing the torque being developed by the fluid motor when operating in either direction and a second portion for generating a differential pressure proportional to the speed of the fluid motor. These portions are connected to produce a combined signal which is applied to servo means functioning to govern the operation of motor snubbing and braking means by which the final movement of the thrust reversing structure will be controlled.

An object of the invention is to provide a fluidic circuit with which the torque and speed of the fluid motor can be sensed and signals proportional thereto generated and utilized to govern the operation of the motor during critical stages of deploying and stowing the thrust reversing mechanism.

A further object of the invention is to provide a fluidic circuit having a plurality of branches, one having diode and amplifier components which sense differential pressure between the inlet and outlet of a fluid motor and generate a fluidic signal related thereto and the other branch having a fluid motor driven pulse generator with pulse shaping and amplifying components and frequency to analog converting means, signals from these branches being combined and dynamically compensated then applied to servo means for effecting operation of motor snubbing and braking devices.

Other objects and advantages of the control system will be pointed out in the following description of the control system illustrated in the accompanying drawing.

IN THE DRAWINGS

FIG. 1 is a schematic view showing a fluid motor and other pneumatic components provided to move thrust reversing equipment between stowed and deployed positions;

FIG. 2 is a block diagram of a fluidic system employed to control the motor and components shown in FIG. 1;

DESCRIPTION

Figure 3:
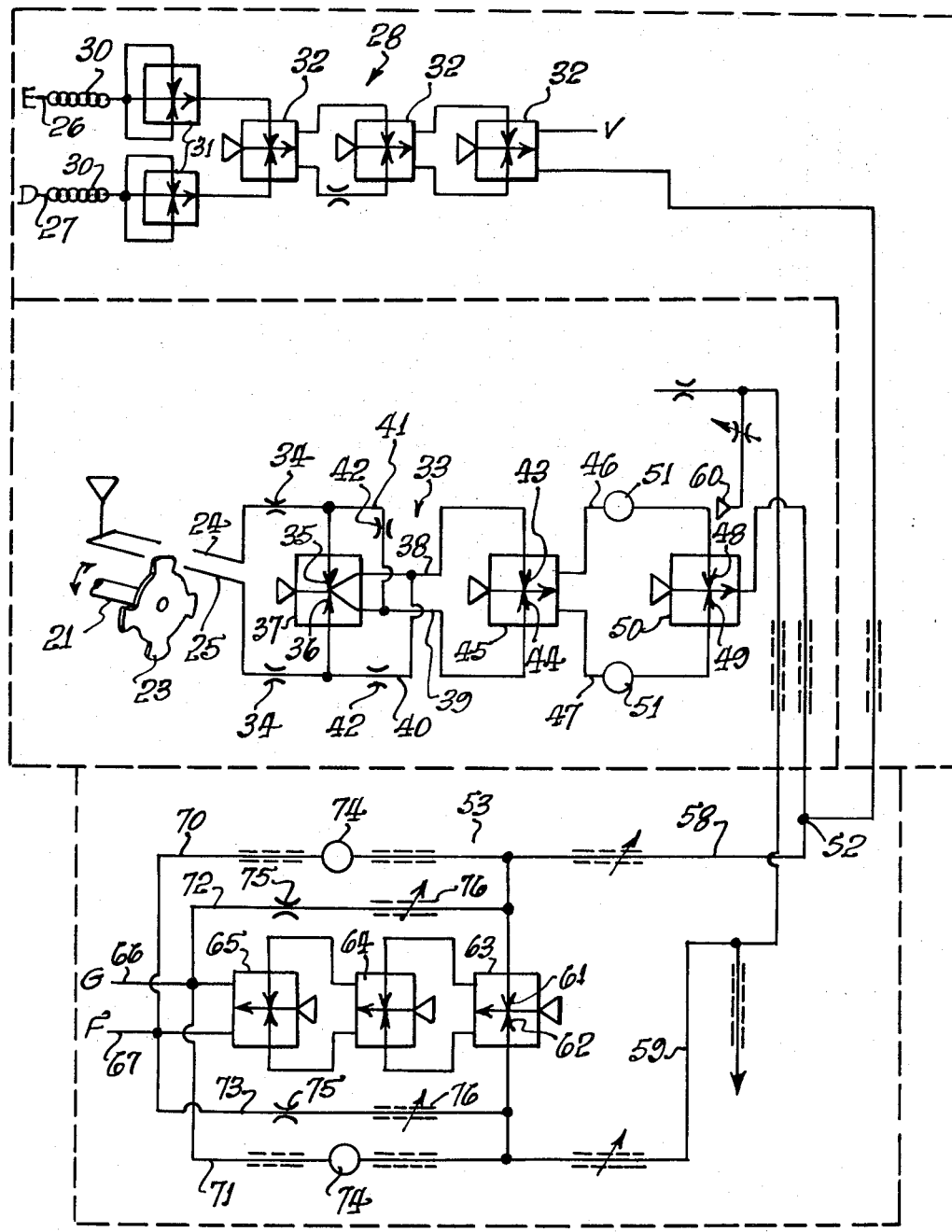
FIG. 3 is a more detailed schematic diagram of the fluidic control system for the thrust reversing mechanism.

Referring more particularly to FIG. 1 of the drawings, the fluid motor 10 used to drive the thrust reversing mechanism is schematically illustrated as of the gear type having a pair of intermeshing rotors 11 and 12 supported in a casing 13. Combined inlet and outlet ports 14 and 15 are provided, as usual, on opposite sides of the casing for the introduction of fluid under pressure from a suitable source to effect forward and/or reverse operation of the motor in deploying and stowing movements of the thrust reversing mechanism (not shown). A fluid duct 16 leads from the pressure source (not shown) to a directional control valve 17 and branch lines 18 and 19 extend from the valve to the ports 14 and 15, respectively. An exhaust line 20 leads from the valve 17 to a suitable discharge point. A shaft 21 is connected for rotation with one of the rotors in motor 10. It will be apparent that valve 17 may be disposed in either of two positions to connect one or the other of branch lines 18 and 19 with line 16 and the other with exhaust line 20 and the motor will operate in forward or reverse direction.

The exhaust line 20 is provided with a valve 22 which is used to control fluid flow through the motor and thus the pressure differential between the inlet and outlet in either direction of rotation. This pressure differential is a function of the torque being developed by the motor. In the following description and claims valve 22 is referred to as a snubber or snubbing valve and it assists in governing the torque exerted by the motor. The fluidic control circuit utilizes the sensed torque to provide a control signal.

The fluidic control circuit also utilizes a speed sensor to create another control signal. The speed sensor is composed of a notched disk 23 which is secured for rotation with the shaft 21 and is disposed with the notched peripheral portion in position to periodically interrupt fluid flow through supply lines 24 and 25 leading from a source of fluid, such as air, under pressure to the fluidic system. Since the disk is directly driven by the fluid motor the interruption to flow will create pulses the frequency of which is a function of the motor speed.

As shown in FIG. 1 pressure differential sensing tubes 26 and 27 communicate with the inlet and outlet lines, 16 and 20, respectively, of the fluid motor; they lead to a first circuit means 28 of the fluidic control system. Circuit means 28, see FIG. 3, includes a series of restrictions 30 in each of the tubes 26 and 27. Such tubes lead to a pair of diodes 31 from which output signals are applied to the control ports of an oscillator 32 used to generate signals which are amplified by components 32 as many times as may be found desirable to produce a signal representative of the torque developed by the fluid motor.

The fluidic control system includes a second circuit means 33 in which the fluid pulses representative of motor speed are shaped, converted from frequency to analog signals and otherwise treated. Circuit means 33 has a frequency to pressure converting means to which the lines 24 and 25 lead. These lines communicate via restrictors 34 with control ports 35 and 36 of an oscillator 37 from which output lines 38 and 39 extend. Feedback lines 40 and 41 extend from output lines 38 and 39 to lines 25 and 24, respectively, the feedback lines also being provided with restrictors 42. Lines 38 and 39 lead to the control ports 43 and 44 of an amplifier 45 which in turn has output lines 46 and 47 leading to the control ports 48 and 49 of a diode type amplifier 50. Lines 46 and 47 are equipped with capacitors 51 for smoothing out excessive variations in the output signals from amplifier 45.

The output signals from circuit sections 28 and 33 are combined as at 52 and applied to a dynamic compensation circuit section 53 in which the combined torque and speed signals are further treated and amplified to produce signals employed to actuate a servo device 54 (see FIG. 1). The latter means controls the application of pressure to the actuators 55 and 56 of the snubber valve 22 and a brake mechanism 57, respectively, mechanism 57 previously mentioned as being associated with the shaft 21 of the fluid motor. This shaft also extends to and is connected with motion transmitting mechanism employed to drive the thrust reversing structure.

Circuit section 53 includes line 58, leading from the point 52 of combination of signals from sections 28 and 33, and a line 59 leading from a source 60 of reference pressure. Lines 58 and 59, communicate with control ports 61 and 62 of the first of a series 63, 64 and 65 of amplifiers. Output lines 66 and 67 lead from the final amplifier to ports 68 and 69 of the servo device 54. Feedback lines 70, 71, 72, and 73 connect output lines 66 and 67 with the control ports 61 and 62, lines 70 and 71 being provided with capacitors 74 and connecting ports 61 and 62 with lines 67 and 66, respectively, lines 72 and 73 being provided with suitable fixed and variable resistors 75 and 76 and connecting ports 61 and 62 with lines 66 and 67, respectively.

As previously mentioned the fluidic system is employed primarily during the final stages of deploying and stowing the thrust reverser mechanism. As the mechanism approaches such final stages suitable switch means (not shown) are actuated to render the fluidic system operative. At this time the speed and torque sensors will generate impulses which the circuit portions will modify and apply to the servo-device. The latter will effect the application and/or release of pressure to the actuators for the snubber valve and brake to reduce and control the speed and torque of the motor during the final stages of movement. When the final positions of the thrust reverser mechanism are reached other switch means (not show) are actuated to interrupt the operation of motor 10 and the fluidic control system.

We claim:

1. A fluidic control system for a jet engine thrust reverser of the type having a fluid motor with snubbing and braking means operative to control the torque and speed of the motor comprising:

a. a first circuit means connected with the inlet and outlet of said fluid motor and operative in response to a pressure differential to generate a signal representative of the torque developed by the motor;

b. a second circuit means having pulse frequency generating and frequency to pressure conversion means responsive to the operation of said motor to generate a differential pressure proportional to the speed of said motor; and c. servo means responsive to said torque signal and differential pressure to control the operation of the snubbing and braking means.

2. A fluidic control system as set forth in claim 1 in which said first circuit means has means for sensing and amplifying pressure differentials between the inlet and outlet of the fluid motor.

3. A fluidic control system as set forth in claim 1 in which said first circuit means has means for sensing pressure differentials between the inlet and outlet of the fluid motor; means for combining the sensed pressure differentials with a reference pressure; and means for amplifying the combined pressures to generate the signal representative of the torque developed by the motor.

4. A fluidic control system as set forth in claim 1 in which said second circuit means has means for sensing the speed of the fluid motor and means for generating a fluid pulse with a frequency proportional to said speed.

5. A fluidic control system as set forth in claim 1 in which said second circuit means has a pulse generator of the jet interrupter type driven by the fluid motor to provide a pulse frequency proportional to the speed of the motor, said second circuit means also having frequency to pressure converter means to produce the differential pressure proportional to the speed of the motor.

6. A fluidic control system as set forth in claim 1 in which said second circuit means has means driven by the fluid motor for generating a signal with a pulse frequency proportional to the speed of the motor; means for shaping and amplifying such signal; means receiving said shaped and amplified signal and converting the same to a differential pressure proportional to the speed of the motor.

7. A fluidic control system as set forth in claim 6 in which the signal generated by said first circuit means is combined with the differential pressure produced by said second circuit means and applied to said servo means to control the operation of the snubbing and braking means.

8. A fluidic control system as set forth in claim 7 in which dynamic compensation circuit means are provided between the point where the outputs of the first and second circuit means are combined and said servo means to control flow of fluid under pressure to the motor.

* * * * *